(12) United States Patent
Cho et al.

(10) Patent No.: US 12,403,949 B2
(45) Date of Patent: Sep. 2, 2025

(54) OPERATION CONTROL METHOD OF DUAL INTEGRATED CONTROL APPARATUS FOR AUTONOMOUS DRIVING VEHICLE

(71) Applicants: Hyundai Motor Company, Seoul (KR); Kia Corporation, Seoul (KR); SL Corporation, Daegu (KR)

(72) Inventors: Jae Wan Cho, Seoul (KR); Won Jin Jeong, Hwaseong-Si (KR); Chun Nyung Heo, Gyeongsan-Si (KR); Gwang Sun Kim, Gyeongsan-Si (KR); Yong Woo Park, Gyeongsan-Si (KR); Jae Hoon Jung, Gyeongsan-Si (KR); Seok Woo Ye, Daegu (KR); Mi Rae Do, Gyeongsan-Si (KR)

(73) Assignees: Hyundai Motor Company, Seoul (KR); Kia Corporation, Seoul (KR); SL Corporation, Daegu (KR)

( * ) Notice: Subject to any disclaimer, the term of this patent is extended or adjusted under 35 U.S.C. 154(b) by 196 days.

(21) Appl. No.: 18/387,761

(22) Filed: Nov. 7, 2023

(65) Prior Publication Data

US 2024/0383520 A1 Nov. 21, 2024

(30) Foreign Application Priority Data

May 19, 2023 (KR) .................. 10-2023-0064825

(51) Int. Cl.
*B62D 1/12* (2006.01)
*B60W 60/00* (2020.01)

(52) U.S. Cl.
CPC ........... *B62D 1/12* (2013.01); *B60W 60/0053* (2020.02); *B60W 2510/20* (2013.01)

(58) Field of Classification Search
CPC .. B60W 2510/20; B60W 60/0053; B62D 1/12
See application file for complete search history.

(56) References Cited

U.S. PATENT DOCUMENTS 5,471,260 A * 11/1995 Luce .................... A61B 3/0075
351/205
2021/0070414 A1 3/2021 Bondesson et al.
(Continued)

FOREIGN PATENT DOCUMENTS

JP 2006-027394 2/2006
JP 2020-177423 10/2020
(Continued)

*Primary Examiner* — Kito R Robinson
*Assistant Examiner* — Rose Ridder
(74) *Attorney, Agent, or Firm* — Morgan Lewis & Bockius LLP

(57) ABSTRACT

In an operation control method of an integrated control apparatus for an autonomous driving vehicle, when a steering operation is performed on both of a first joystick lever and a second joystick lever to return to neutral positions after the steering operation, a lever which is always pivoted in an adduction direction is set to a function activation state, or a lever set to the function activation state during the steering operation is continuously maintained in the function activation state until the return to the neutral position is completed after the steering operation. In the present way, a user can more easily recognize the joystick lever in the function activation state.

19 Claims, 14 Drawing Sheets

(56) References Cited

U.S. PATENT DOCUMENTS

| | | | |
|---|---|---|---|
| 2021/0380165 A1* | 12/2021 | Chao | B62D 7/1509 |
| 2022/0221854 A1 | 7/2022 | Kuehner | |
| 2022/0363362 A1* | 11/2022 | Inoue | B63H 25/42 |
| 2023/0050365 A1* | 2/2023 | Heo | B62D 5/005 |
| 2024/0367690 A1* | 11/2024 | Cho | B60K 26/02 |

FOREIGN PATENT DOCUMENTS

| | | |
|---|---|---|
| KR | 10-1166895 | 7/2012 |
| KR | 10-2022-0031824 | 3/2022 |
| KR | 10-2022-0132703 | 10/2022 |
| KR | 10-2024-0154132 | 10/2024 |

* cited by examiner

OPERATION CONTROL METHOD OF DUAL INTEGRATED CONTROL APPARATUS FOR AUTONOMOUS DRIVING VEHICLE

CROSS REFERENCE TO RELATED APPLICATION

The present application claims priority to Korean Patent Application No. 10-2023-0064825 filed on May 19, 2023, the entire contents of which is incorporated herein for all purposes by this reference.

BACKGROUND OF THE PRESENT DISCLOSURE

Field of the Present Disclosure

The present disclosure relates to an operation control method of a dual integrated control apparatus for an autonomous driving vehicle, and more particularly, to a method of controlling an operation of a dual joystick lever provided in an autonomous driving vehicle.

Description of Related Art

An autonomous driving vehicle is a smart vehicle incorporating an autonomous driving technology that goes to a destination by itself without a driver directly operating a steering wheel, an accelerator pedal, or a brake of the vehicle.

When an autonomous driving situation is generally realized, it is possible to select a manual driving mode in which a driver directly drives an autonomous driving vehicle by himself/herself, and an autonomous driving mode in which the autonomous driving vehicle travels by itself to a destination even when the driver does not drive the autonomous driving vehicle by himself/herself.

Meanwhile, when an emergency situation occurs during autonomous driving, one of passengers of the autonomous driving vehicle should manually operate the autonomous driving vehicle, and for the present purpose, an apparatus operated by the passenger for a manual driving mode should be provided in the autonomous driving vehicle.

For example, there is a case in which a vehicle manager operates the autonomous driving vehicle in the manual driving mode using an apparatus such as a joystick used in a game machine.

In the manual driving mode situation, the apparatus that a user operates for driving the autonomous driving vehicle is equipped with a plurality of switches operated for acceleration, braking, steering, and shifting of the autonomous driving vehicle, and because the plurality of switches with different functions are provided together, the plurality of switches may be referred to as an integrated control apparatus.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a control method of setting one of two joystick levers to a function activation state and an operation direction when a user performs a steering operation on the two joystick levers together to return to a neutral position after the steering in a configuration in which an autonomous driving vehicle is provided with the two joystick levers so that the user can more easily recognize the joystick lever in the function activation state and feel comfortable during the steering operation.

According to one aspect, there is provided an operation control method of a dual integrated control apparatus for an autonomous driving vehicle, which includes a grip operation in which a user grips a first joystick lever and a second joystick lever provided in the autonomous driving vehicle by both hands; and a steering setting operation in which, when the user performs a steering operation on both of the first joystick lever and the second joystick lever, steering operation directions of the first joystick lever and the second joystick lever are determined, any one of the levers pivoted in an adduction direction is set to a function activation state and the other lever pivoted in an abduction direction is set to a function inactivation state.

The operation control method may further include, before the steering setting operation, a grip setting operation of determining a first recognized touch sensor of a touch sensor provided in the first joystick lever and a touch sensor provided in the second joystick lever and setting any one lever provided with the first recognized touch sensor to the function activation state and setting the other lever to the function inactivation state.

When the touch sensor provided in the first joystick lever is recognized earlier than the touch sensor provided in the second joystick lever in the grip setting operation, the first joystick lever may be set to the function activation state, and when the touch sensor provided in the second joystick lever is recognized earlier than the touch sensor provided in the first joystick lever, the second joystick lever may be set to the function activation state.

The operation control method may further include an information display operation of transmitting information on the first joystick lever or the second joystick lever, which is set to the function activation state through the grip setting operation, to the driver using one or more devices among a lever light-emitting diode (LED), a haptic motor, and a display.

The steering operation of the first joystick lever and the second joystick lever may be detected by the position sensors, each including a magnet and a Hall sensor, and a main printed circuit board (PCB) may receive values detected by the position sensors and may individually determine steering operation directions of the first joystick lever and the second joystick lever.

When the first joystick lever is pivoted in the adduction direction in the steering setting operation, the first joystick lever may be set to the function activation state, and when the second joystick lever is pivoted in the adduction direction, the second joystick lever may be set to the function activation state.

After the first joystick lever is set to the function activation state in the steering setting stage from a time point when the first joystick lever starts to return to a neutral position to a time point when the return to the neutral position is completed, the first joystick lever may be pivoted in the abduction direction, and thus the first joystick lever may be set to the function inactivation state, and the second joystick lever may be pivoted in the adduction direction, and thus the second joystick lever may be set to the function activation state.

When the first joystick lever is set to the function activation state in the steering setting operation, and then the first joystick lever returns in a direction of a neutral position, the first joystick lever may be pivoted in the abduction direction, and thus the first joystick lever may be set to the function inactivation state, and the second joystick lever may be pivoted in the adduction direction, and thus the second joystick lever may be set to the function activation state.

When the second joystick lever is maintained in a pivoted state in the adduction direction before the return of the second joystick lever to the neutral position is completed, the second joystick lever may be maintained in the function activation state, and the first joystick lever may be maintained in the function inactivation state, and when the second joystick lever is not maintained in the pivoted state in the adduction direction, the second joystick lever may be set to the function inactivation state and the first joystick lever may be set to the function activation state.

After the second joystick lever is set to the function activation state in the steering setting stage from a time point when the second joystick lever starts to return to a neutral position to a time point when the return to the neutral position is completed, the second joystick lever may be pivoted in the abduction direction, and thus the second joystick lever may be set to the function inactivation state, and the first joystick lever may be pivoted in the adduction direction, and thus the first joystick lever may be set to the function activation state.

When the second joystick lever is set to the function activation state in the steering setting operation, and then the second joystick lever returns in a direction of the neutral position, the second joystick lever may be pivoted in the abduction direction, and thus the second joystick lever may be set to the function inactivation state, and the first joystick lever may be pivoted in the adduction direction, and thus the first joystick lever may be set to the function activation state.

When the first joystick lever is maintained in the pivoted state in the adduction direction before the return of the first joystick lever to the neutral position is completed, the first joystick lever may be maintained in the function activation state, and the second joystick lever may be maintained in the function inactivation state, and when the first joystick lever is not maintained in the pivoted state in the adduction direction, the first joystick lever may be set to the function inactivation state and the second joystick lever may be set to the function activation state.

After the first joystick lever is set to the function activation state in the steering setting operation and until the return of the first joystick lever to a neutral position is completed, the first joystick lever may be continuously maintained in the function activation state, and the second joystick lever may be continuously maintained in the function inactivation state.

After the second joystick lever is set to the function activation state in the steering setting operation and until the return of the second joystick lever to a neutral position is completed, the second joystick lever may be continuously maintained in the function activation state, and the first joystick lever may be continuously maintained in the function inactivation state.

A lever of the first joystick lever and the second joystick lever set to the function inactivation state may follow the operation of a lever set to the function activation state.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
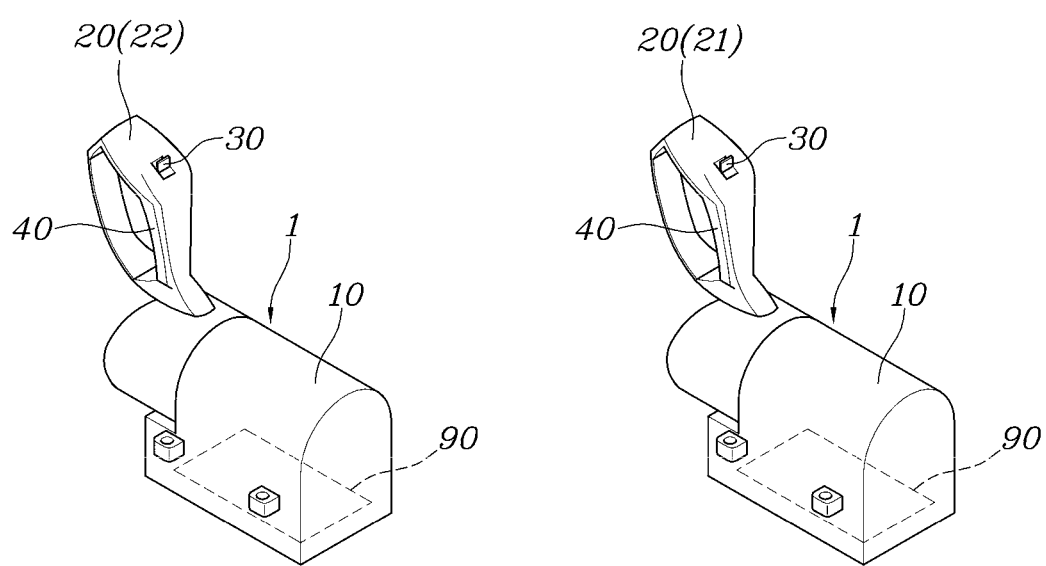
FIG. 1 is a diagram illustrating that an integrated control apparatus provided with a joystick lever is dually formed in an autonomous driving vehicle according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the drawings. The same reference numerals are provided to the same or similar components regardless of reference numerals, and a repetitive description thereof will be omitted.

As used in the following description, suffixes "module" and "part" for a component are used or interchangeably used solely for ease of preparation of the specification, and do not have different meanings and each thereof does not function by itself.

In describing embodiments included in the present specification, when a detailed description of a known related art is determined to obscure the gist of the present specification, the detailed description thereof will be omitted herein.

Furthermore, the accompanying drawings are merely for easy understanding of the exemplary embodiments included in the present specification, the technical spirit included in the present specification is not limited by the accompanying drawings, and it should be understood to include all modifications, equivalents, and substitutes included in the spirit and scope of the present disclosure.

Terms including ordinal numbers such as first, second, and the like used herein may be used to describe various components, but the various components are not limited by these terms. The terms are used only for distinguishing one component from another component.

When a component is referred to as being "connected" or "coupled" to another component, the component may be directly connected or coupled to another component, but it should be understood that sill another component may be present between the component and another component.

Conversely, when a component is referred to as being "directly connected" or "directly coupled" to another, it should be understood that yet another component may not be present between the component and another component.

Unless the context clearly dictates otherwise, the singular form includes the plural form.

In the present specification, the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

Furthermore, a unit or a control unit included in the names of a motor control unit (MCU), a hybrid control unit (HCU), and the like is a term widely used in the naming of a control device that is configured to control a specific vehicle function and does not refer to a generic function unit.

For example, a controller may include a communication device configured for communicating with other control units or sensors to control a responsible function, a memory for storing an operating system, a logic command, and input/output information, and one or more processors for performing determination, calculation, and decision which are necessary for controlling the responsible function.

Hereinafter, an integrated control apparatus for an autonomous driving vehicle and an operation control method thereof according to exemplary embodiments of the present disclosure will be described with reference to the accompanying drawings.

An autonomous driving vehicle is provided with an integrated control apparatus which allows a user (a manager) to operate the autonomous driving vehicle by himself or herself in a manual driving mode.

As shown in FIGS. 1 to 7, an integrated control apparatus 1 according to an exemplary embodiment of the present disclosure includes a main body 10 including a housing to form an external body, and a joystick lever 20 rotatably coupled to the main body 10 and held by hand of a driver to be operated.

The integrated control apparatus 1 provided with the main body 10 and the joystick lever 20 may be dually provided in an autonomous driving vehicle. Any one of the dually provided integrated control apparatuses 1 may be provided at a right side of the user or a driver seat in the autonomous driving vehicle to allow the user to easily operate integrated control apparatus 1 using a right hand, and the other one may be provided at a left side of the user or the driver seat in the autonomous driving vehicle to allow the user to easily operate integrated control apparatus 1 using a left hand.

When the integrated control apparatus 1 is provided in the autonomous driving vehicle, the main body 10 may be fixedly provided at a designated position inside the autonomous driving vehicle so as not to be moved or may be used to be moved to a position that the user wants, as necessary.

One main body 10 is provided in one integrated control apparatus 1, and one joystick lever 20 is provided in one main body 10.

The joystick lever 20, which is provided in each main body 10, may be referred to as a first joystick lever 21 or a second joystick lever 22, and in an exemplary embodiment of the present disclosure, a right lever is referred to as the first joystick lever 21 and a left lever as the second joystick lever 22, but the opposite may be possible.

The integrated control apparatus 1 may include the joystick lever 20 and include a toggle switch 30, a touch sensor 40, a lever printed circuit board (PCB) 50, a lever light-emitting diode (LED) 60, a haptic motor 70, and a prism 80, which are provided at the joystick lever 20, and a main PCB 90 provided at the main body 10.

After the user grips the joystick lever 20 by hand, the user may operates an entirety of the joystick lever 20 by pivoting the joystick lever 20 in a front and rear direction and a left and right direction with respect to the main body 10.

In a state in which the user holds the joystick lever 20 by hand, when the user pivots the joystick lever 20 forward (a direction R1 in FIG. 2), the main PCB 90 generates a signal related to acceleration of the vehicle, and when the user pivots the joystick lever 20 backward (a direction R2 in FIG. 2), the main PCB 90 generates a signal related to deceleration of the vehicle.

Furthermore, when the user pivots the joystick lever 20 to the right or left (a direction R3 or R4 in FIG. 2) in a state of holding the joystick lever 20 by hand, the main PCB 90 generates a signal related to steering of the vehicle.

When the vehicle is accelerated or decelerated by operation of the joystick lever 20, a speed of the vehicle is changed in a large range. In the present way, rapid acceleration and sudden braking are possible, and the speed change in the large range may be performed, for example, by 5 Km/h or 10 Km/h.

The joystick lever 20 is provided with a toggle switch 30 which is operable by his or her fingers of the user.

The toggle switch 30 may be provided in a form of a button.

The toggle switch 30 may be provided on an upper surface of the joystick lever 20 to be operable by the thumb of the hand gripping the joystick lever 20.

When the user pushes the toggle switch 30 forward (a direction M1 in FIG. 2) to operate, the main PCB 90 generates a signal related to acceleration of the vehicle, and when the user pulls the toggle switch 30 (a direction M2 in FIG. 2) to operate, the main PCB 90 generates a signal related to deceleration of the vehicle.

When the vehicle is accelerated or decelerated by operation of the toggle switch 30, the speed change of the vehicle is changed in a fine range which is smaller than the range when the joystick lever 20 is operated. In the present way, it may be usefully used when driving is required while slowly increasing or decreasing the speed, such as when parking, stopping, or U-turning, and the speed change in the fine range may be performed, for example, by 1 Km/h.

The joystick lever 20 is provided with a touch sensor 40 which is configured for detecting gripping of the joystick lever 20 by the hand of the user, that is, detecting when the user touches the joystick lever 20.

The touch sensor 40 is fixedly provided at a grip portion of the joystick lever 20, which is gripped by the hand of the user.

The touch sensor 40 may be, for example, a capacitive touch sensor and may include a touch button which generates a physical signal by the user's operation.

The touch sensor 40 is formed of an assembly of two or more individual sensors 41. As one example shown in the drawing, touch sensor 40 is formed of three individual sensors 41 but the number of individual sensors 41 may be adjustable, as necessary.

Figure 2:
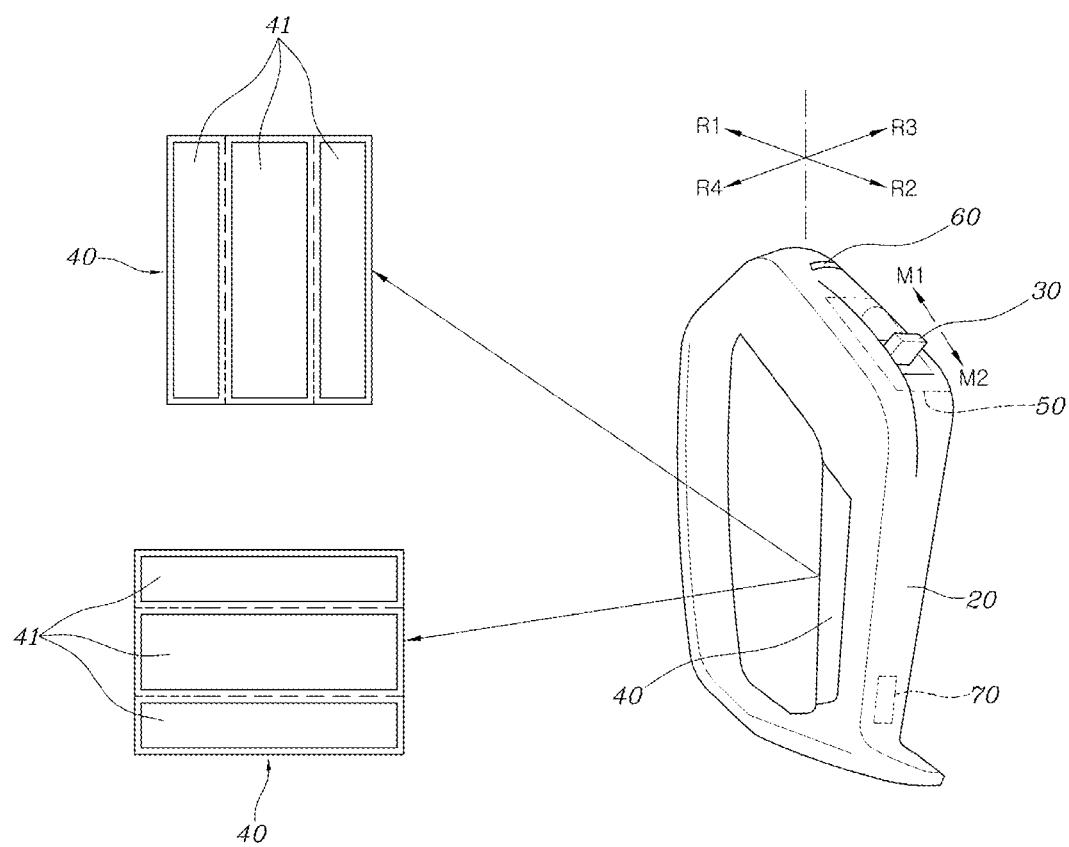
FIG. 2 is a diagram for describing the joystick lever.

As shown in FIG. 2, two or more individual sensors 41 may be formed to be continuously disposed in a horizontal direction or a vertical direction, and when the user grips the joystick lever 20, all the individual sensors 41 are provided to be brought into contact with the hand of the user.

The touch sensor 40 is surrounded and protected by a cover 23 coupled to the joystick lever 20.

The lever PCB 50 is fixed at the joystick lever 20 by the medium of the bracket 51.

The lever PCB 50 may be fixed on the upper surface of the joystick lever 20 and may be configured for controlling an operation of the lever light-emitting diode (LED) 60 and the haptic motor 70 and transmit and receive signals to or from main PCB 90.

When a manual driving mode signal is generated while the vehicle is traveling in an autonomous driving mode, the lever PCB 50 may be configured to generate a signal corresponding to a function activation state or a function inactivation state of the joystick lever 20 according to a situation (condition) in which the user touches the touch sensor 40.

In an autonomous driving vehicle, a manual driving mode in which a driver drives an autonomous driving vehicle by himself or herself may be selected and an autonomous driving mode in which the autonomous driving vehicle travels by itself to a destination without the driver driving the autonomous driving vehicle by himself or herself may be selected.

Figure 4:
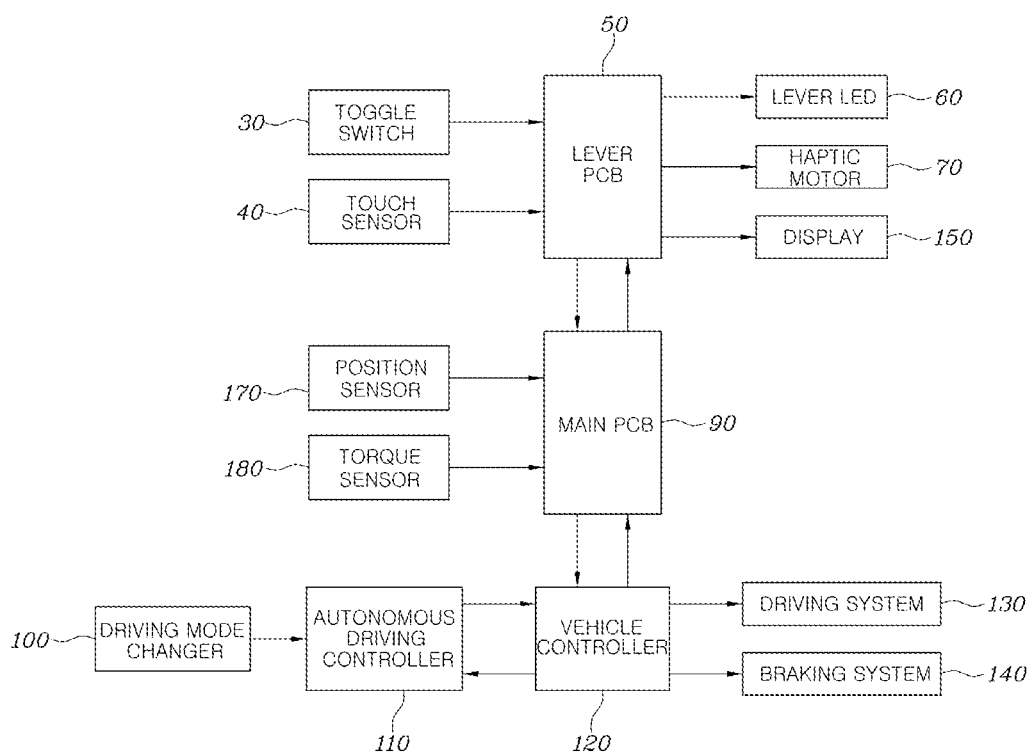
FIG. 4 is a schematic block diagram illustrating a configuration of the integrated control apparatus according to an exemplary embodiment of the present disclosure.

As shown in FIG. 4, the driver may operate a driving mode changer 100 to select an autonomous driving mode or a manual driving mode of the vehicle.

The driving mode changer 100 may be formed of a switch, a button, or a dial for generating an autonomous driving mode signal and a manual driving mode signal.

To facilitate the operation of the driver, the driving mode changer 100 may be provided in the vicinity of the driver seat or may be positioned on a seat in the autonomous driving vehicle, as necessary.

The signal of the driving mode changer 100 may be transmitted to an autonomous driving controller 110 of the vehicle, the autonomous driving controller 110 may transmit a control signal to a vehicle controller 120, and the vehicle controller 120 may transmit the control signal to a driving system 130 and a braking system 140 of the vehicle to perform acceleration or braking of the vehicle.

The main PCB 90 and the vehicle controller 120 may transmit and receive signals to or from each other.

Herein, the lever PCB 50, the mam PCB 90, the autonomous driving controller 110 and the vehicle controller 120 may be implemented as separate semiconductor circuits. Alternatively, the lever PCB 50, the main PCB 90, the autonomous driving controller 110 and the vehicle controller 120 may be implemented as a single integrated semiconductor circuit.

In the integrated control apparatus 1 according to an exemplary embodiment of the present disclosure, the function activation state or the function inactivation state may be executed according to a touch situation (a contact situation) in which the user touches the touch sensor 40 in a state in which the joystick lever 20 is popped upwards.

The function inactivation state may include a function inactivation floating state and a function inactivation fixed state.

Figure 5:
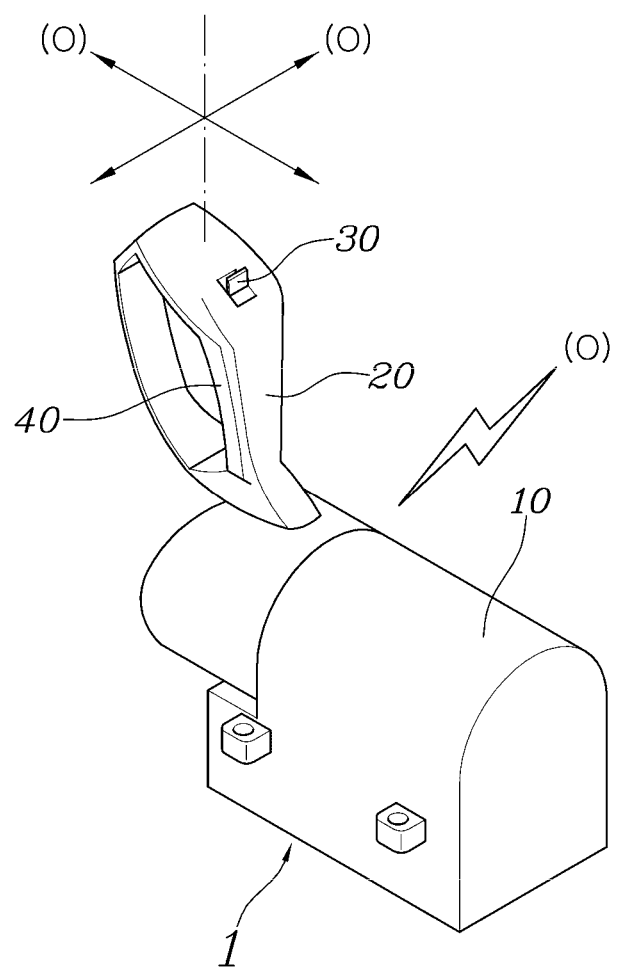
FIG. 5, FIG. 6 and FIG. 7 are diagrams for describing a function activation state, a function inactivation floating state, and a function inactivation fixed state of the joystick lever according to an exemplary embodiment of the present disclosure.

FIG. 5 shows the function activation state, and the function activation state may be defined as a state O in which a pivoting operation of the joystick lever 20 is possible by the user in the front and rear direction and the left and right direction, and during the operation of the joystick lever 20, any one or more of an acceleration signal, a deceleration signal, and a steering signal of the vehicle is generated under the control of the main PCB 90.

The function activation state may be defined as an active mode or an active state.

Figure 6:
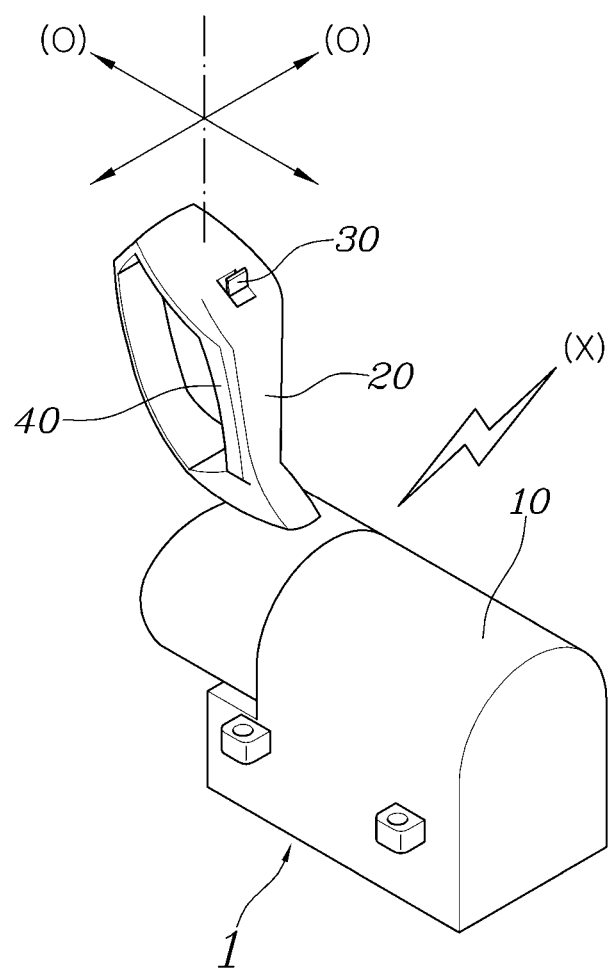
Figure 7:
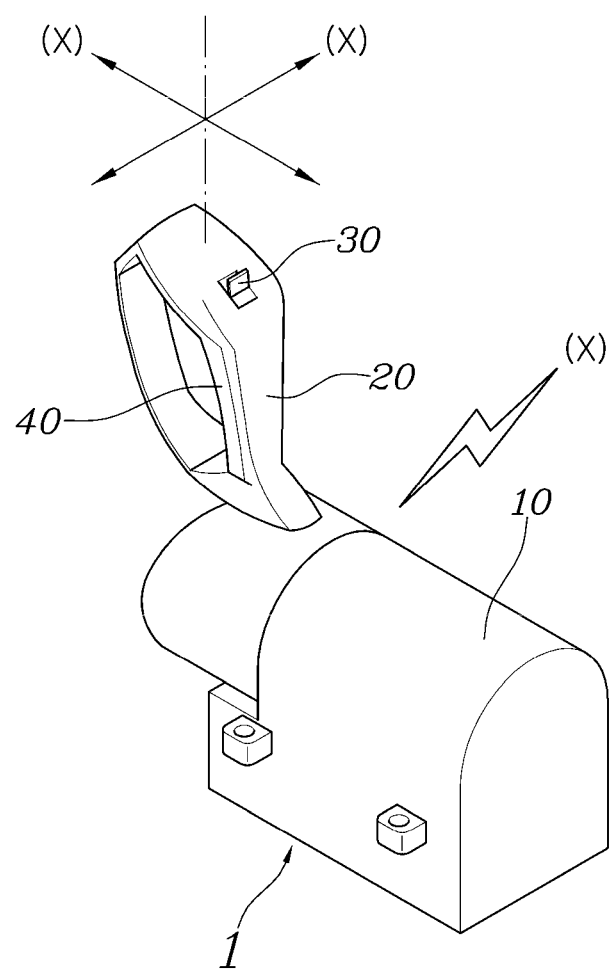

FIG. 6 and FIG. 7 show the function inactivation state. FIG. 6 of the drawings shows the function inactivation floating state, and the function inactivation floating state may be defined as a state O in which the joystick lever 20 may perform a pivoting operation in the front and rear direction and the left and right direction and a state X in which the acceleration signal, the deceleration signal, or the steering signal of the vehicle is not generated even when the user operates the joystick lever 20.

FIG. 7 shows the function inactivation fixed state, and the function inactivation fixed state may be defined as a state X in which movement of the joystick lever 20 is impossible, and thus the operation of the joystick lever 20 is impossible, and a state X in which the operation of the joystick lever 20 is impossible, and thus the deceleration signal, or the steering signal of the vehicle is not generated.

When the first joystick lever 21 and the second joystick lever 22 are provided in the vehicle, the driver may drive the vehicle by alternately operating the first joystick lever 21 and the second joystick lever 22 using the exemplary hand of the left and right hands. Alternatively, the driver may operate the joystick lever by one hand and use the other hand to drink liquid refreshment.

Alternatively, when a precise operation is required, such as when passing through an alleyway, the user may perform a precise steering operation by operation the first joystick lever 21 and the second joystick lever 22 together by both hands.

Alternatively, when a large body motion occurs due to rapid cornering, the user may set one of the first joystick lever 21 and the second joystick lever 22 to the function activation state to operate a function manipulation by one hand and maintain the other to maintain the fixed state of function inactivation, serving a support so that the user may feel psychological stability.

In the exemplary embodiment of the present disclosure, because the lever set to the function inactivation state among the first joystick lever 21 and the second joystick lever 22 follows the operation of the lever set to the function activation state, the function inactivation state in an exemplary embodiment of the present disclosure means only the inactivation floating state.

When the manual driving mode signal is generated while the vehicle is traveling in the autonomous driving mode and the user grips the grip portion of the joystick lever 20, only in a state in which the user touches all the individual sensors 41 forming the touch sensor 40, the lever PCB 50 generates a signal of the function activation state. When the user does not touch any individual sensor 41, the lever PCB 50 generates a signal of the function inactivation state.

In the present way, when the driver or a passenger of a passenger seat unintentionally touches the joystick lever 20, activation of the joystick lever 20 may be prevented to achieve improvement of driving safety.

The integrated control apparatus 1 according to an exemplary embodiment of the present disclosure further includes the lever LED 60 coupled to the joystick lever 20 and turned on or off under the control of the lever PCB 50.

The lever LED 60 may be electrically connected to the lever PCB 50 and may be fixed at the bracket 51.

The lever LED 60 is a component for enabling the user to easily recognize visually the function activation state of the joystick lever 20, and the lever LED 60 is desirable to be a component which is turned on in the function activation state of the joystick lever 20 and is turned off in the function inactivation state of the joystick lever 20.

The integrated control apparatus 1 according to an exemplary embodiment of the present disclosure further includes a prism 80 coupled to the joystick lever 20 and configured to diffuse light generated from the lever LED 60.

Due to the light diffused through the prism 80, the user may more easily recognize that the joystick lever 20 is in the function activation state.

Furthermore, the integrated control apparatus 1 according to an exemplary embodiment of the present disclosure further includes a haptic motor 70 coupled to the joystick lever 20 and operated under the control of the lever PCB 50 to generate a tactile signal.

The haptic motor 70 is a component for enabling the user to easily tactilely recognize the function activation state or the function inactivation state of the joystick lever 20, and it is desirable for the haptic motor 70 to be operated to generate different types of tactile signals in the function activation state and the function inactivation state.

The haptic motor 70 may be formed to generate a tactile signal in the function activation state of the joystick lever 20 and not to generate a tactile signal in the function inactivation state of the joystick lever 20. Conversely, the haptic motor 70 may be formed not to generate a tactile signal in the function activation state of the joystick lever 20 and to generate a tactile signal in the function inactivation state of the joystick lever 20.

In the present way, the driver may easily recognize the function activation state or the function inactivation state of the joystick lever 20 so that it is helpful in misoperation prevention and driving safety.

For the user to more reliably recognize a vibration of the haptic motor 70, the haptic motor 70 is positioned in the grip portion of the joystick lever 20 gripped by the user.

Figure 3:
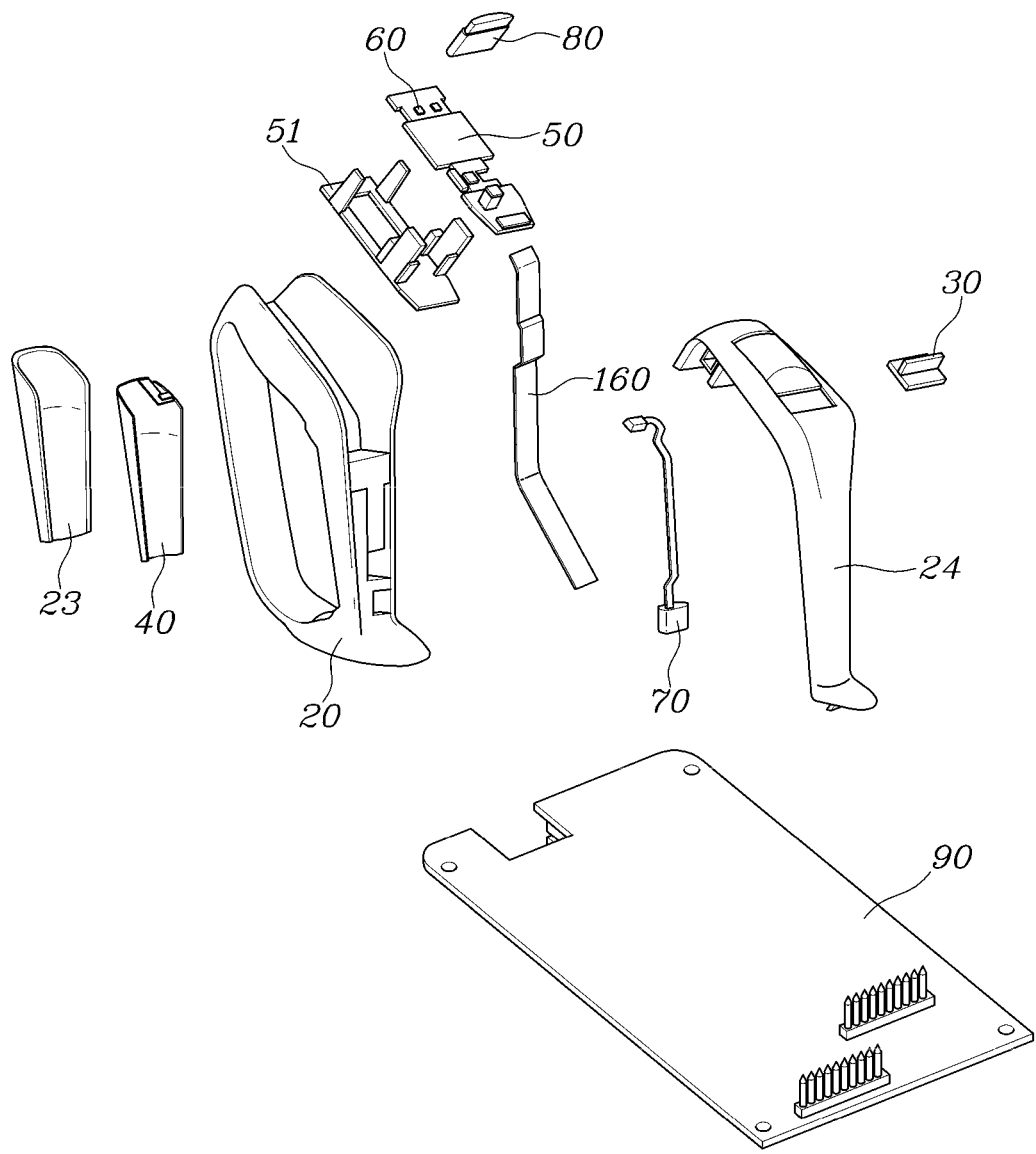
FIG. 3 is an exploded view exemplarily illustrating the joystick lever.

As shown in FIG. 3, the lever PCB 50 and the haptic motor 70 are electrically connected through a flexible cable 160, and the lever PCB 50, the lever LED 60, and the haptic motor 70 may be covered and protected by the cover 24 coupled to the joystick lever 20.

The function activation state and the function inactivation state of the joystick lever 20 may be displayed on a display 150 of the vehicle under the control of the lever PCB 50. In the present way, the driver may more easily recognize the function activation state or the function inactivation state of the joystick lever 20.

Furthermore, the integrated control apparatus 1 according to an exemplary embodiment of the present disclosure further includes a position sensor 170 configured for detecting a steering operation of the joystick lever 20.

The user performs a steering operation by pivoting the joystick lever 20 to the right or left, and during the steering operation, the steering operation is detected using the position sensor 170.

The position sensor 170 includes a magnet and a Hall sensor configured for detecting the steering operation and an operation direction of the joystick lever 20.

The position sensor 170 may be provided as one or more position sensors 170 per integrated control apparatus 1 to individually detect a steering operation direction of the first joystick lever 21 and a steering operation direction of the second joystick lever 22, the steering operation direction of the first joystick lever 21 and the steering operation direction of the second joystick lever 22, which are detected by the position sensors 170, may be transmitted to the main PCB 90, and the main PCB 90 may be configured to determine the steering operation direction of the first joystick lever 21 and the steering operation direction of the second joystick lever 22.

Figure 8:
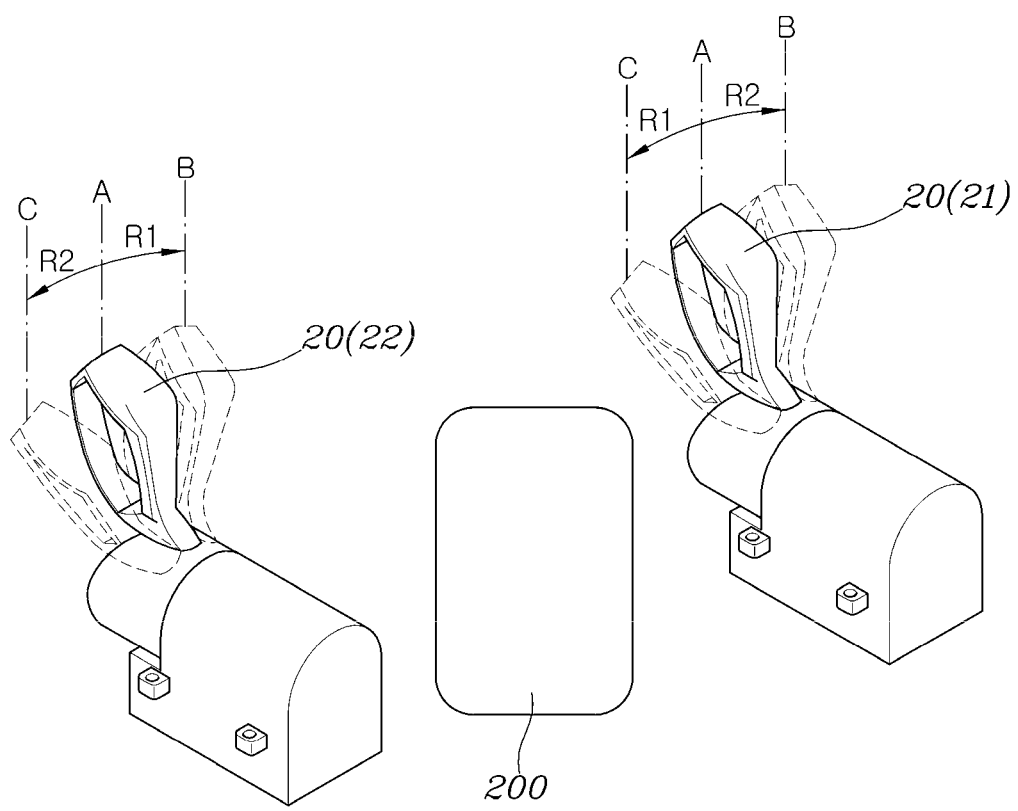
FIG. 8 is a diagram for describing an adduction direction and an abduction direction during performing of a steering operation on a first joystick lever and a second joystick lever according to an exemplary embodiment of the present disclosure.

Referring to FIG. 8, the first joystick lever 21 and the second joystick lever 22 are positioned at right and left sides with a body 200 of the user therebetween. During the steering operation, a direction in which the first joystick lever 21 or the second joystick lever 22 is pivoted toward the body 200 of the user may be defined as an adduction direction, and conversely, a direction in which the first joystick lever 21 or the second joystick lever 22 is pivoted outward the body 200 of the user may be defined as an abduction direction thereof.

Positions A of the first joystick lever 21 and second joystick lever 22 are neutral positions before the user operation, and positions B and C are positions pivoted from positions an in a clockwise direction and a counterclockwise direction, respectively, by the user operation.

Hereinafter, the adduction direction is denoted as R1, and the abduction direction is denoted as R2.

In the case of the first joystick lever 21, a direction from position A to position C becomes the adduction direction R1, and a direction from position A to position B becomes the abduction direction R2.

In the case of the second joystick lever 22, a direction from position A to position B becomes the adduction direction R1, and a direction from position A to position C becomes the abduction direction R2.

Furthermore, the integrated control apparatus 1 according to an exemplary embodiment of the present disclosure further includes a torque sensor 180 configured for detecting an operation force when the user pivots the joystick lever 20 to the right or left to perform the steering operation.

The torque sensor 180 includes a torsion bar twisted during the performing of the steering operation on the joystick lever 20, and a magnet and a Hall sensor configured for measuring a torsion amount of the torsion bar.

The torque sensor 180 may be provided as one or more torque sensor 180 per integrated control apparatus 1 to individually measure a steering operation force of the first joystick lever 21 and a steering operation force of the second joystick lever 22, the steering operation force of the first joystick lever 21 and the steering operation force of the second joystick lever 22, which are measured by the torque sensors 180, may be transmitted to the main PCB 90, and the main PCB 90 may compare a magnitude of the steering operation force of the first joystick lever 21 with a steering operation force of the second joystick lever 22.

When the main PCB 90 determines the magnitude of the steering operation force of the first joystick lever 21 and the steering operation force of the second joystick lever 22, values measured by the torque sensors 180 are compared as absolute values to determine the magnitude of the steering operation force regardless of a steering operation direction of the first joystick lever 21 and a steering operation direction of the second joystick lever 22.

That is, the main PCB 90 compares the values measured by the torque sensors 180 as absolute values to determine the magnitude of the steering operation force regardless of the adduction direction or the abduction direction of the first joystick lever 21 and the second joystick lever 22.

Hereinafter, an operation control method of an integrated control apparatus for an autonomous driving vehicle according to an exemplary embodiment of the present disclosure will be described with reference to FIGS. 9 to 14.

Figure 9:
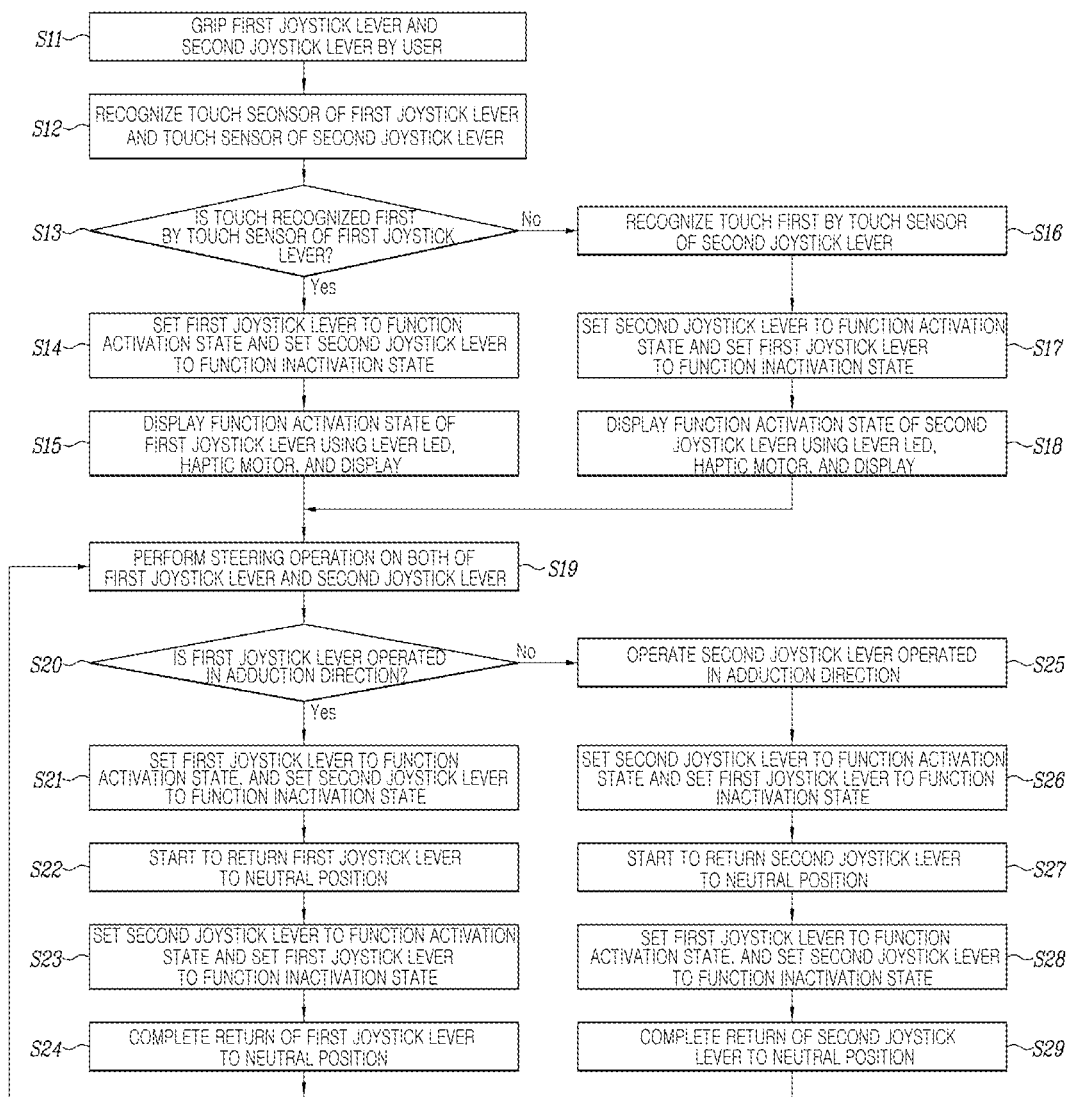
FIG. 9 is a flowchart for describing a control method of various exemplary embodiments according to an exemplary embodiment of the present disclosure.

FIG. 9 is a flowchart for describing a control method of various exemplary embodiments according to an exemplary embodiment of the present disclosure.

In the control method of the various exemplary embodiments of the present disclosure, when the user holds the first joystick lever 21 and the second joystick lever 22 by both hands and performs a steering operation, and when the levers return to neutral positions, a lever pivoted in the adduction direction R1 is set to a function activation state, and a lever pivoted in the abduction direction R2 is set to a function inactivation state.

That is, the control method of the various exemplary embodiments includes a grip operation in which the user grips the first joystick lever 21 and the second joystick lever 22 provided in the autonomous driving vehicle by both hands, and a steering setting operation in which, when the user performs a steering operation on both of the first joystick lever 21 and the second joystick lever 22, steering operation directions of the first joystick lever 21 and the second joystick lever 22 are determined, any one of the levers pivoted in the adduction direction R1 is set to the function activation state the other lever pivoted in the abduction direction R2 is set to the function inactivation state.

Because the user grips the first joystick lever 21 and the second joystick lever 22 by both hands to operate the joystick lever 20 (operation S11), operation S11 corresponds to the grip operation.

The user holds and grips the grip portion of the first joystick lever 21 and the grip portion of the second joystick lever 22 by hands, and in the instant case, each of the grip portions of the levers is provided with the touch sensor 40 to recognize a lever touch of the user.

That is, the touch sensor 40 of the first joystick lever 21 recognizes a touch of the first joystick lever 21 by the user, and the touch sensor 40 of the second joystick lever 22 recognizes a touch of the second joystick lever 22 by the user (operation S12).

A signal of the touch sensor 40 of the first joystick lever 21 and a signal of the touch sensor 40 of the second joystick lever 22 are transmitted to the lever PCB 50, and the lever PCB 50 or the main PCB 90 is configured to determine whether the touch sensor 40 of the first joystick lever 21 is recognized earlier or the touch sensor 40 of the second joystick lever 22 is recognized earlier.

In operation S13, it is determined whether the touch sensor 40 of the first joystick lever 21 is recognized earlier, and as a result of the determination, when it is determined that the touch sensor 40 of the first joystick lever 21 is recognized earlier than the touch sensor 40 of the second joystick lever 22, the first joystick lever 21 is controlled to be set to the function activation state and the second joystick lever 22 is controlled to be set to the function inactivation state (operation S14).

Operations S13 and S14 correspond to a grip setting operation.

That is, the grip setting operation is a logic executed before the steering setting operation is executed and is an operation of determining a first recognized touch sensor of the touch sensor 40 provided in the first joystick lever 21 and the touch sensor 40 provided in the second joystick lever 22 and setting any one lever provided with the first recognized touch sensor to the function activation state and setting the other lever to the function inactivation state.

In operation S15, the function activation state of the first joystick lever 21 may be displayed at one or more devices among the lever LED 60, the haptic motor 70, and the display 150 under the control of the lever PCB 50 to be transmitted to the driver. In the present way, the driver may easily recognize the lever in the function activation state so that fatigue of the driver may be reduced when operating the joystick lever.

Operation S15 corresponds to an information display operation.

Otherwise, as a result of the determination in operation S13, when it is determined that the touch sensor 40 of the second joystick lever 22 is recognized earlier than the touch sensor 40 of the first joystick lever 21 (operation S16), the second joystick lever 22 is controlled to be set to the function activation state and the first joystick lever 21 is controlled to be set to the function inactivation state (operation S17).

Operations S16 and S17 are included in the grip setting operation.

In operation S18, the function activation state of the second joystick lever 22 may be displayed at one or more devices among the lever LED 60, the haptic motor 70, and the display 150 under the control of the lever PCB 50 to be transmitted to the driver. In the present way, the driver may easily recognize the lever in the function activation state so that fatigue of the driver may be reduced when operating the joystick lever.

Operation S18 is also included in the information display operation.

After the first joystick lever 21 is set to the function activation state or the second joystick lever 22 is set to the function activation state through operations S14 and S17, the steering operation is performed on both of the first joystick lever 21 and the second joystick lever 22 by operation of the user (operation S19).

When the steering operation is performed on both of the first joystick lever 21 and the second joystick lever 22 through operation S19, a steering operation direction of the first joystick lever 21 and a steering operation direction of the second joystick lever 22 are detected by the position sensors 170, values detected by the position sensors 170 are transmitted to the main PCB 90, and the main PCB 90 is configured to determine the steering operation direction of the first joystick lever 21 and the steering operation direction of the second joystick lever 22 (operation S20).

As a result of the determination in operation S20, when the steering operation direction of the first joystick lever 21 is determined as the adduction direction R1, the first joystick lever 21 is controlled to be set to the function activation state, and the second joystick lever 22 is controlled to be set to the function inactivation state (operation S21).

Operations S20 and S21 correspond to the steering setting operation.

After the first joystick lever 21 is set to the function activation state through operation S21, the first joystick lever 21 starts to return to a neutral position A (operation S22), the first joystick lever 21 is pivoted in the abduction direction R2 from a time point when the return to the neutral position A starts to a time point when the return to the neutral position A is completed, and thus the first joystick lever 21 is set to the function inactivation state, and the second joystick lever 22 is pivoted in the adduction direction R1, and thus the second joystick lever 22 is set to the function activation state (operations S23 and S24).

Operations S23 and S24 correspond to a return setting operation.

In the exemplary embodiment of the present disclosure, when the first joystick lever 21 is set to the function activation state in the steering setting operation, and then the first joystick lever 21 returns in a direction of the neutral position, the first joystick lever 21 is pivoted in the abduction direction, and thus the first joystick lever 21 may be set to the function inactivation state, and the second joystick lever 22 is pivoted in the adduction direction, and thus the second joystick lever 22 may be set to the function activation state.

Furthermore, when the second joystick lever 22 is maintained in the pivoted state in the adduction direction before the return of the second joystick lever 22 to the neutral position is completed, the second joystick lever 22 may be maintained in the function activation state, and the first joystick lever 21 may be maintained in the function inactivation state, and when the second joystick lever 22 is not maintained in the pivoted state in the adduction direction, the second joystick lever 22 may be set to the function inactivation state and the first joystick lever 21 may be set to the function activation state.

Otherwise, as a result of the determination in operation S20, when it is determined that the steering operation direction of the first joystick lever 21 is not the adduction direction R1, the steering operation direction of the second joystick lever 22 is determined as the adduction direction R1 (operation S25). In the instant case, the second joystick lever 22 is controlled to be set to the function activation state, and the first joystick lever 21 is controlled to be set to the function inactivation state (operation S26).

Operations S25 and S26 also correspond to the steering setting operation.

After the second joystick lever 22 is set to the function activation state through operation S26, the second joystick lever 22 starts to return to a neutral position A (operation S27), the second joystick lever 22 is pivoted in the abduction direction R2 from a time point when the return to the neutral position A starts to a time point when the return to the neutral position A is completed, and thus the second joystick lever 22 is set to the function inactivation state, and the first joystick lever 21 is pivoted in the adduction direction R1, and thus the first joystick lever 21 is set to the function activation state (operations S28 and S29).

Operations S28 and S29 also correspond to the return setting operation.

In the exemplary embodiment of the present disclosure, when the second joystick lever 22 is set to the function activation state in the steering setting operation, and then the second joystick lever 22 returns in a direction of the neutral position, the second joystick lever 22 is pivoted in the abduction direction, and thus the second joystick lever 22 may be set to the function inactivation state, and the first joystick lever 21 is pivoted in the adduction direction, and thus the first joystick lever 21 may be set to the function activation state.

Furthermore, when the first joystick lever 21 is maintained in the pivoted state in the adduction direction before the return of the first joystick lever 21 to the neutral position is completed, the first joystick lever 21 may be maintained in the function activation state, and the second joystick lever 22 may be maintained in the function inactivation state, and when the first joystick lever 21 is not maintained in the pivoted state in the adduction direction, the first joystick lever 21 may be set to the function inactivation state and the second joystick lever 22 may be set to the function activation state.

The exemplary embodiment of the present disclosure is characterized in that the lever among the first joystick lever 21 and the second joystick lever 22 set to the function inactivation state follows the operation of the lever set to the function activation state. In the present way, the first joystick lever 21 and the second joystick lever 22 are simultaneously aligned in a turning direction of the vehicle so that clear feedback on the turning direction of the vehicle may be provided to the driver.

FIG. 10, FIG. 11, FIG. 12, and FIG. 13 show a situation in which the first joystick lever 21 and the second joystick lever 22 are set to the function activation state and the function inactivation state according to the various exemplary embodiments of the present disclosure.

Figure 10:
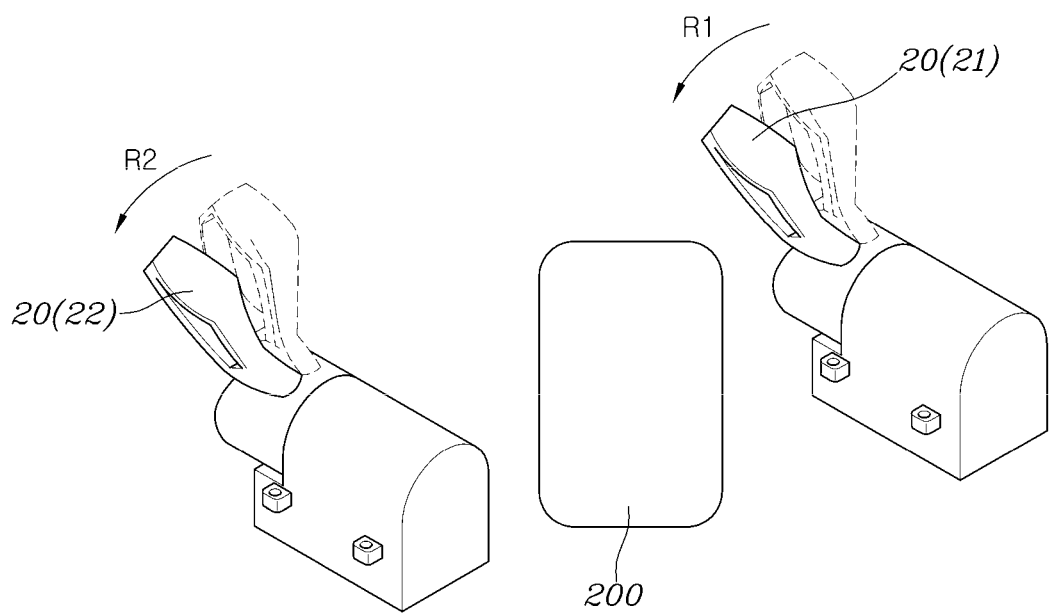
FIG. 10, FIG. 11, FIG. 12, and FIG. 13 are diagrams for describing a situation in which a function activation state and a function inactivation state are set during the performing of a steering operation on the first joystick lever and the second joystick lever and when the first joystick lever and the second joystick lever return to neutral positions according to an exemplary embodiment of the present disclosure.

FIG. 10 shows an operation situation during left turning, the steering operation direction of the first joystick lever 21 becomes the adduction direction R1, and thus the first joystick lever 21 is set to the function activation state, and the steering operation direction of the second joystick lever 22 becomes the abduction direction R2, and thus the second joystick lever 22 is set to the function inactivation state.

Figure 11:
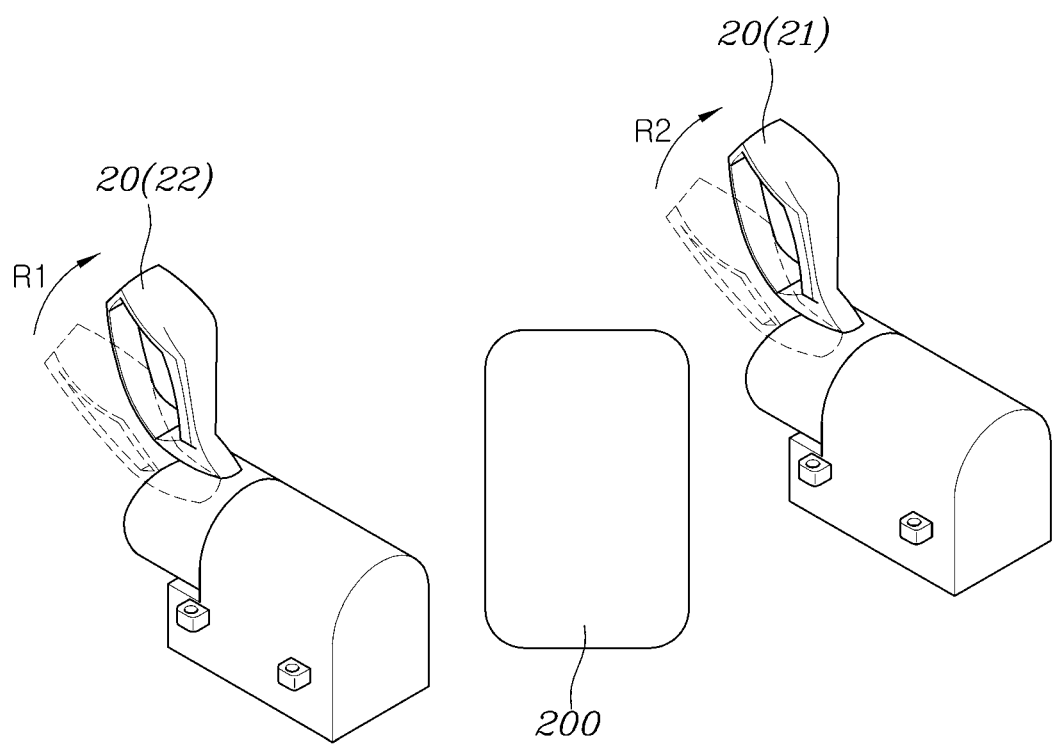

FIG. 11 shows a situation of returning to a neutral position after the left turning operation, a direction of returning to the neutral position of the first joystick lever 21 becomes the abduction direction R2, and thus the first joystick lever 21 is set to the function inactivation state, and a direction of returning to the neutral position of the second joystick lever 22 becomes the adduction direction R1, and thus the second joystick lever 22 is set to the function activation state.

Figure 12:
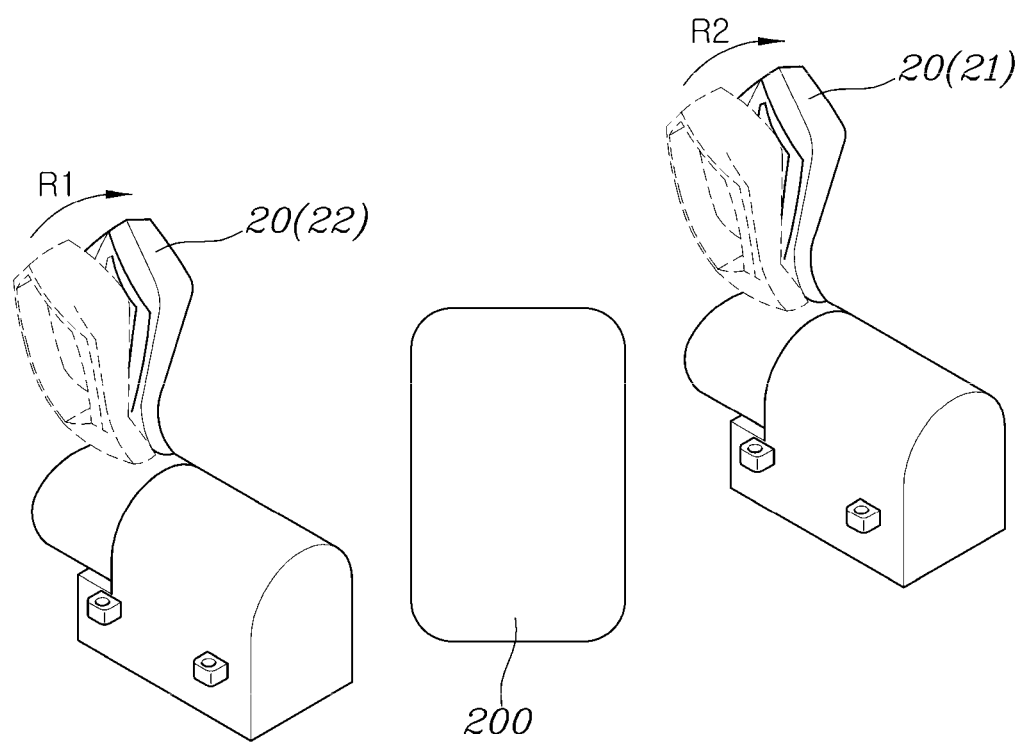

FIG. 12 shows an operation situation during right turning, the steering operation direction of the first joystick lever 21 becomes the abduction direction R2, and thus the first joystick lever 21 is set to the function inactivation state, and the steering operation direction of the second joystick lever 22 becomes the adduction direction R1, and thus the second joystick lever 22 is set to the function activation state.

Figure 13:
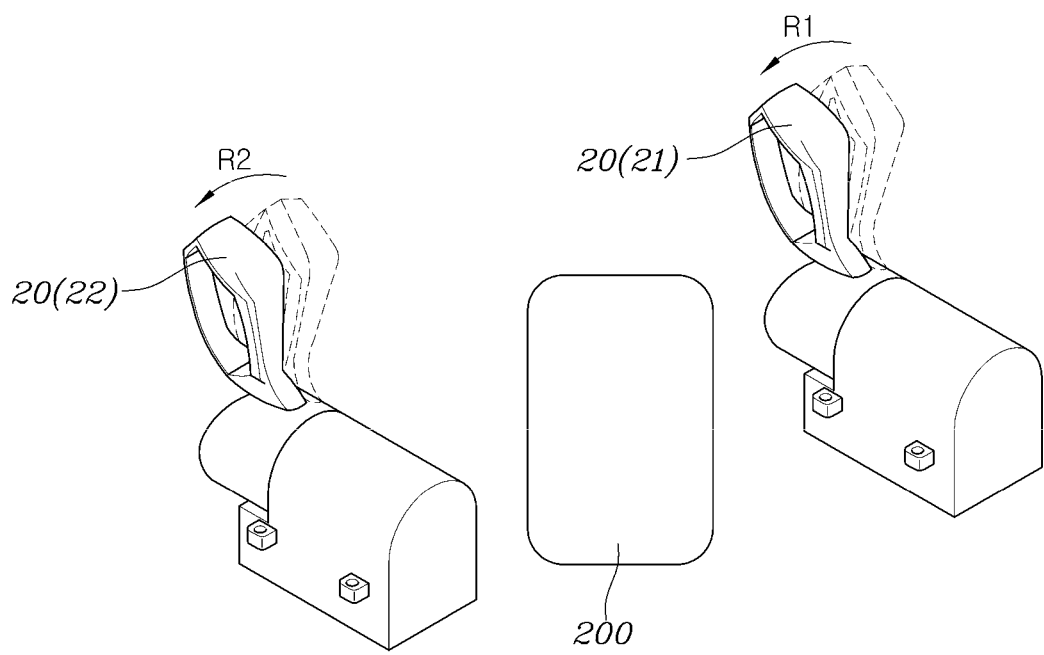

FIG. 13 shows a situation of returning to the neutral position after the right turning operation, a direction of returning to the neutral position of the first joystick lever 21 becomes the adduction direction R1, and thus the first joystick lever 21 is set to the function activation state, and a direction of returning to the neutral position of the second joystick lever 22 becomes the abduction direction R2, and thus the second joystick lever 22 is set to the function inactivation state.

In the various exemplary embodiments according to an exemplary embodiment of the present disclosure, when the steering operation is performed on both of the first joystick lever 21 and the second joystick lever 22 to return to the neutral positions after the steering operation, the lever which is always pivoted in the adduction direction R1 is set to the function activation state. During the steering operation, by setting the lever operated in the adduction direction R1, which is relatively more comfortable than the lever operated in the abduction direction R2, to the function activation state, there are advantages in that the user can more easily recognize the joystick lever in the function activation state, feel comfortable during the steering operation, and feel similar to when operating the existing steering wheel.

Figure 14:
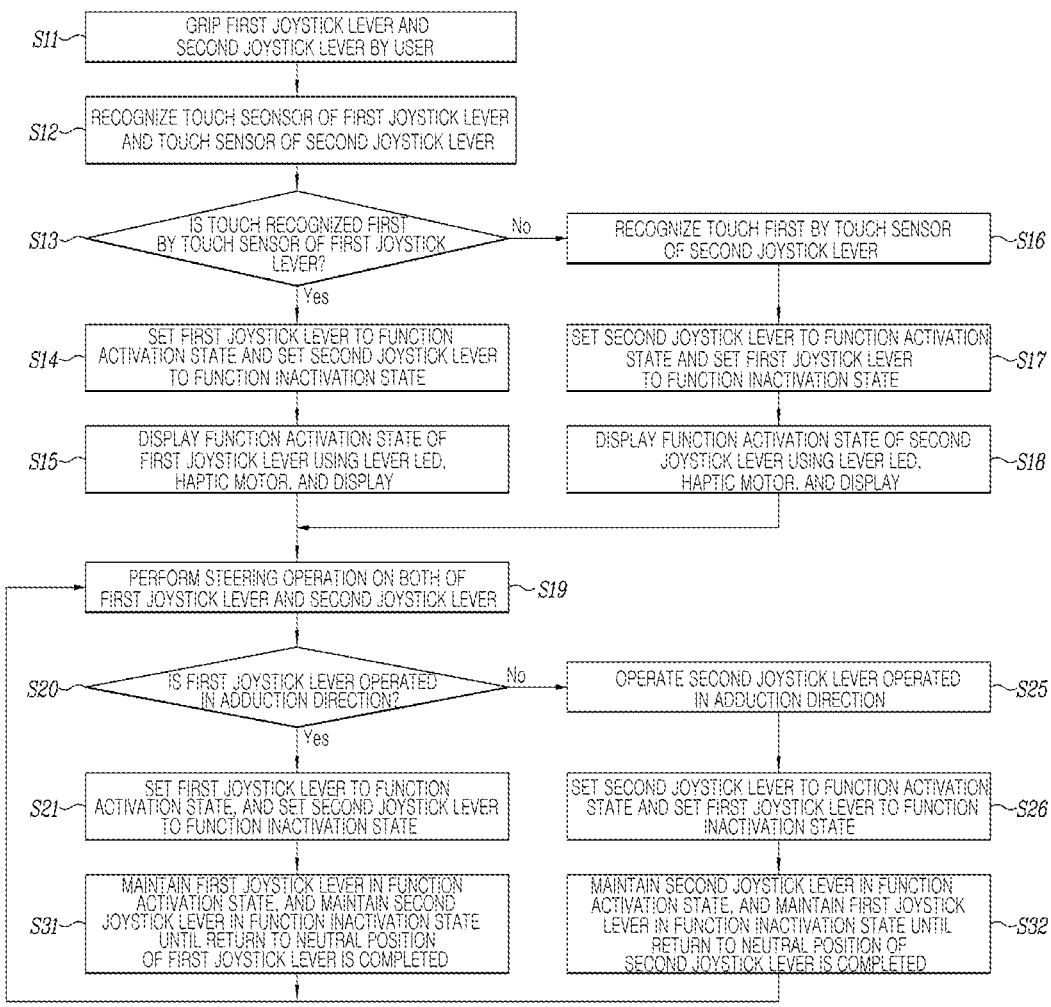
FIG. 14 is a flowchart for describing a control method of various exemplary embodiments according to an exemplary embodiment of the present disclosure.

FIG. 14 is a flowchart for describing a control method of various exemplary embodiments according to an exemplary embodiment of the present disclosure.

The control method of the various exemplary embodiments are characterized in that, during the performing of the steering operation on the first joystick lever 21 and the second joystick lever 22, one lever pivoted in the adduction direction R1 is set to the function activation state and is continuously maintained in the function activation state until the return of the lever on which the steering operation is performed to a neutral position is completed.

Because the control from operations S11 to S21 and the control processing from operation S20 to operations S25 and S26 in FIG. 14 are the same as those described above with reference to FIG. 9, descriptions thereof will be omitted.

After the first joystick lever 21 is set to the function activation state through operation S21, the first joystick lever 21 starts to return to the neutral position A and may be pivoted in the abduction direction R2 from a time point when the return to the neutral position starts to a time point when the return to the neutral position is completed. However, according to an exemplary embodiment of the present disclosure, the first joystick lever 21 is continuously maintained in the function activation state.

Furthermore, a steering operation direction of the second joystick lever 22 becomes the abduction direction R2, and thus the second joystick lever 22 is set to the function inactivation state and may be pivoted in the adduction direction R1 from a time point when the return to the neutral position starts after the steering operation to a time point when the return to the neutral position is completed. However, according to an exemplary embodiment of the present disclosure, the second joystick lever 22 is continuously maintained in the function inactivation state (operation S31).

Furthermore, after the second joystick lever 22 is set to the function activation state through operation S26, the second joystick lever 22 starts to return to the neutral position A and may be pivoted in the abduction direction R2 from a time point when the return to the neutral position starts to a time point when the return to the neutral position is completed. However, according to an exemplary embodiment of the present disclosure, the second joystick lever 22 is continuously maintained in the function activation state.

Furthermore, a steering operation direction of the first joystick lever 21 becomes the abduction direction R2, and thus the first joystick lever 21 is set to the function inactivation state and may be pivoted in the adduction direction R1 from a time point when the return to the neutral position starts after the steering operation to a time point when the return to the neutral position is completed. However, according to an exemplary embodiment of the present disclosure, the first joystick lever 21 is continuously maintained in the function inactivation state (operation S32).

Operations S31 and S32 correspond to the return setting operation.

In the return setting operation, the joystick lever set to an active state in the steering setting operation is continuously maintained in the active state until the return to the neutral position is completed.

A description of a situation in which the first joystick lever 21 and the second joystick lever 22 are set to the function activation state and the function inactivation state according to the various exemplary embodiments of the present disclosure will be described with reference to FIG. 10, FIG. 11, and FIG. 12, and FIG. 13.

FIG. 10 shows an operation situation during left turning, the steering operation direction of the first joystick lever 21 becomes the adduction direction R1, and thus the first joystick lever 21 is set to the function activation state, and the steering operation direction of the second joystick lever 22 becomes the abduction direction R2, and thus the second joystick lever 22 is set to the function inactivation state.

FIG. 11 shows a situation of returning to the neutral position after the left turning operation, a direction of returning to the neutral position of the first joystick lever 21 may become the abduction direction R2 but, according to an exemplary embodiment of the present disclosure, the first joystick lever 21 is continuously maintained in the function activation state, and a direction of returning to the neutral position of the second joystick lever 22 may become the adduction direction R1 but, according to an exemplary embodiment of the present disclosure, the second joystick lever 22 is continuously maintained in the function inactivation state.

FIG. 12 shows an operation situation during right turning, the steering operation direction of the first joystick lever 21 becomes the abduction direction R2, and thus the first joystick lever 21 is set to the function inactivation state, and the steering operation direction of the second joystick lever 22 becomes the adduction direction R1, and thus the second joystick lever 22 is set to the function activation state.

FIG. 13 shows a situation of returning to the neutral position after the right turning operation, a direction of returning to the neutral position of the first joystick lever 21 may become the adduction direction R1 but, according to an exemplary embodiment of the present disclosure, the first joystick lever 21 is continuously maintained in the function inactivation state, and a direction of returning to the neutral position of the second joystick lever 22 may become the abduction direction R2 but, according to an exemplary embodiment of the present disclosure, the second joystick lever 22 is continuously maintained in the function activation state.

The various exemplary embodiments of the present disclosure is characterized in that, when the steering operation is performed on both of the first joystick lever 21 and the second joystick lever 22, both of the first joystick lever 21 and the second joystick lever 22 are pivoted in the adduction direction R1, but any one lever set to the function activation state is continuously maintained in the function activation state until the return to the neutral position of the one lever is completed after the steering operation. There is an advantage in that the user can more easily recognize the joystick lever in the function activation state from the steering operation to the return completion.

As described above, according to the exemplary embodiments of the present disclosure, when the steering operation is performed on both of the first joystick lever 21 and the second joystick lever 22 to return the first joystick lever 21 and the second joystick lever 22 to the neutral positions after the steering operation, a lever pivoted in the adduction direction R1 is always set to the function activation state. Thus, there are advantages in that the user can more easily recognize the joystick lever in the function activation state, feel comfortable during the steering operation, and feel similar to when operating the existing steering wheel.

Furthermore, according to the exemplary embodiments of the present disclosure, when the steering operation is performed on both the of the first joystick lever 21 and the second joystick lever 22, both of the first joystick lever 21 and the second joystick lever 22 are pivoted in the adduction direction R1, but a lever set to the function activation state is continuously maintained in the function activation state until the return to the neutral position of the one lever is completed after the steering operation. Thus, there is an advantage in that the user can more easily recognize the joystick lever in the function activation state from the steering operation to the return completion.

In accordance with the exemplary embodiments of the present disclosure, when a steering operation is performed on both of a first joystick lever and a second joystick lever to return the first joystick lever and the second joystick lever to neutral positions after the steering operation, a lever pivoted in an adduction direction is always set to a function activation state. Thus, there are effects in that a user can more easily recognize a joystick lever in a function activation state, feel comfortable during the steering operation, and feel similar to when operating the existing steering wheel.

Furthermore, in accordance with the exemplary embodiments of the present disclosure, when the steering operation is performed on both of the first joystick lever and the second joystick lever, both of the first joystick lever and the second joystick lever are pivoted in the adduction direction, but one lever set to the function activation state is continuously maintained in the function activation state until the return to the neutral position of the one lever is completed after the steering operation. Thus, there is an effect in that the user can more easily recognize the joystick lever in the function activation state from the steering operation to the return completion.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An operation control method of an integrated control apparatus for an autonomous driving vehicle, the operation control method comprising:
    a steering setting operation in which, in response that a user performs a steering operation on a first joystick lever and a second joystick lever provided in the autonomous driving vehicle by both hands thereof, steering operation directions of the first joystick lever and the second joystick lever are determined, one pivoted in an adduction direction among the first joystick lever and the second joystick lever is set to a function activation state and the other lever pivoted in an abduction direction among the first joystick lever and the second joystick lever is set to a function inactivation state.

2. The operation control method of claim 1, further including:
    before the steering setting operation, determining a first recognized touch sensor of a touch sensor provided in the first joystick lever and a touch sensor provided in the second joystick lever and setting any one lever provided with the first recognized touch sensor to the function activation state and setting the other lever to the function inactivation state.

3. The operation control method of claim 2, wherein, in response that the touch sensor provided in the first joystick lever is recognized earlier than the touch sensor provided in the second joystick lever when the user grips the first joystick lever and the second joystick lever provided in the autonomous driving vehicle by both hands, the first joystick lever is set to the function activation state, and in response that the touch sensor provided in the second joystick lever is recognized earlier than the touch sensor provided in the first joystick lever, the second joystick lever is set to the function activation state.

4. The operation control method of claim 2, further including:
    transmitting information on the first joystick lever or the second joystick lever, which is set to the function activation state through the grip setting operation, to the user using one or more devices among a lever light-emitting diode (LED), a haptic motor, and a display.

5. The operation control method of claim 1, wherein the steering operation of the first joystick lever and the second joystick lever is detected by position sensors, and each of the position sensors includes a magnet and a Hall sensor, and a main printed circuit board (PCB) receives values detected by the position sensors and individually determines the steering operation directions of the first joystick lever and the second joystick lever.

6. The operation control method of claim 1, wherein, in response that the first joystick lever is pivoted in the adduction direction in the steering setting operation, the first joystick lever is set to the function activation state, and in response that the second joystick lever is pivoted in the adduction direction, the second joystick lever is set to the function activation state.

7. The operation control method of claim 1, wherein, after the first joystick lever is set to the function activation state in the steering setting operation from a time point in which the first joystick lever starts to return to a neutral position to a time point in which the return to the neutral position is completed, the first joystick lever is pivoted in the abduction direction, and thus the first joystick lever is set to the function inactivation state, and the second joystick lever is pivoted in the adduction direction, and thus the second joystick lever is set to the function activation state.

8. The operation control method of claim 1, wherein, in response that the first joystick lever is set to the function activation state in the steering setting operation, and then the first joystick lever returns in a direction of a neutral position, the first joystick lever is pivoted in the abduction direction, and thus the first joystick lever is set to the function inactivation state, and the second joystick lever is pivoted in the adduction direction, and thus the second joystick lever is set to the function activation state.

9. The operation control method of claim 8, wherein, in response that the second joystick lever is maintained in a pivoted state in the adduction direction before the return of the second joystick lever to the neutral position is completed, the second joystick lever is maintained in the function activation state, and the first joystick lever is maintained in the function inactivation state, and in response that the second joystick lever is not maintained in the pivoted state in the adduction direction, the second joystick lever is set to the function inactivation state and the first joystick lever is set to the function activation state.

10. The operation control method of claim 1, wherein, after the second joystick lever is set to the function activation state in the steering setting operation from a time point in which the second joystick lever starts to return to a neutral position to a time point in which the return to the neutral position is completed, the second joystick lever is pivoted in the abduction direction, and thus the second joystick lever is set to the function inactivation state, and the first joystick lever is pivoted in the adduction direction, and thus the first joystick lever is set to the function activation state.

11. The operation control method of claim 1, wherein, in response that the second joystick lever is set to the function activation state in the steering setting operation, and then the second joystick lever returns in a direction of a neutral position, the second joystick lever is pivoted in the abduction direction, and thus the second joystick lever is set to the function inactivation state, and the first joystick lever is pivoted in the adduction direction, and thus the first joystick lever is set to the function activation state.

12. The operation control method of claim 11, wherein, in response that the first joystick lever is maintained in a pivoted state in the adduction direction before the return of the first joystick lever to the neutral position is completed, the first joystick lever is maintained in the function activation state, and the second joystick lever is maintained in the function inactivation state, and in response that the first joystick lever is not maintained in the pivoted state in the adduction direction, the first joystick lever is to be set to the function inactivation state and the second joystick lever is set to the function activation state.

13. The operation control method of claim 1, wherein, after the first joystick lever is set to the function activation state in the steering setting operation and until return of the first joystick lever to a neutral position is completed, the first joystick lever is continuously maintained in the function activation state, and the second joystick lever is continuously maintained in the function inactivation state.

14. The operation control method of claim 1, wherein, after the second joystick lever is set to the function activation state in the steering setting operation and until return of the second joystick lever to a neutral position is completed, the second joystick lever is continuously maintained in the function activation state, and the first joystick lever is continuously maintained in the function inactivation state.

15. The operation control method of claim 1, wherein a lever of the first joystick lever and the second joystick lever set to the function inactivation state follows a operation of a lever set to the function activation state.

16. An integrated control apparatus for an autonomous driving vehicle, the apparatus comprising:
   a first joystick lever and a second joystick lever; and
   a processor and a non-transitory storage medium on which a program is recorded, the program executed by the processor configured for:
      in response that a user performs a steering operation on the first joystick lever and the second joystick lever provided in the autonomous driving vehicle by both hands thereof, determining steering operation directions of the first joystick lever and the second joystick lever; and
      setting one pivoted in an adduction direction among the first joystick lever and the second joystick lever to a function activation state and the other lever pivoted in an abduction direction among the first joystick lever and the second joystick lever to a function inactivation state.

17. The apparatus of claim 16, wherein the processor is further configured for:
   after the first joystick lever is set to the function activation state in the steering setting operation from a time point in which the first joystick lever starts to return to a neutral position to a time point in which the return to the neutral position is completed, pivoting the first joystick lever in the abduction direction, so that the first joystick lever is set to the function inactivation state, and pivoting the second joystick lever in the adduction direction, so that the second joystick lever is set to the function activation state.

18. The apparatus of claim 16, wherein the processor is further configured for:
   after the second joystick lever is set to the function activation state in the steering setting operation from a time point in which the second joystick lever starts to return to a neutral position to a time point in which the return to the neutral position is completed, pivoting the second joystick lever in the abduction direction so that the second joystick lever is set to the function inactivation state, and pivoting the first joystick lever in the adduction direction, so that the first joystick lever is set to the function activation state.

19. The apparatus of claim 16, wherein the processor is further configured for:
   after the first joystick lever is set to the function activation state in the steering setting operation and until return of the first joystick lever to a neutral position is completed, continuously maintaining the first joystick lever in the function activation state, and continuously maintaining the second joystick lever in the function inactivation state, and
   after the second joystick lever is set to the function activation state in the steering setting operation and until return of the second joystick lever to a neutral position is completed, continuously maintaining the second joystick lever in the function activation state, and continuously maintaining the first joystick lever in the function inactivation state.

* * * * *